(12) United States Patent
Clark et al.

(10) Patent No.: US 7,680,077 B1
(45) Date of Patent: Mar. 16, 2010

(54) STATISTICAL PRIORITY-BASED MULTIPLE ACCESS SYSTEM AND METHOD

(75) Inventors: Stephen M. Clark, Marion, IA (US); Kelli A. Hoback, Cedar Rapids, IA (US); Scott J. F. Zogg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1478 days.

(21) Appl. No.: 10/210,648

(22) Filed: Jul. 31, 2002

(51) Int. Cl.
  *H04W 4/00* (2009.01)
(52) U.S. Cl. .................. 370/329; 370/448; 370/468
(58) Field of Classification Search .................. None
  See application file for complete search history.

(56) References Cited

U.S. PATENT DOCUMENTS

| | | | |
|---|---|---|---|
| 6,169,761 B1 * | 1/2001 | Marcoccia et al. | 375/132 |
| 6,522,650 B1 * | 2/2003 | Yonge et al. | 370/390 |
| 6,671,331 B1 * | 12/2003 | Sakuma | 375/316 |
| 6,721,331 B1 * | 4/2004 | Agrawal et al. | 370/448 |
| 6,836,469 B1 * | 12/2004 | Wu | 370/322 |
| 6,917,606 B2 * | 7/2005 | Sashihara | 370/338 |
| 2002/0009067 A1 * | 1/2002 | Sachs et al. | 370/338 |
| 2003/0012217 A1 * | 1/2003 | Andersson et al. | 370/437 |
| 2003/0053469 A1 * | 3/2003 | Wentink | 370/412 |

\* cited by examiner

*Primary Examiner*—Jayanti K Patel
*Assistant Examiner*—Jung Park
(74) *Attorney, Agent, or Firm*—Matthew J. Evans; Daniel M. Barbieri (57) ABSTRACT

A system and method for controlling channel access in a communications system is disclosed. The method and system include providing a data packet to communications queue and determining the priority of the data packet. The method and system also generate a channel occupancy statistic. The channel occupancy statistic is based on the level of activity on a communications channel during a predetermined period. The method and system also compare the channel occupancy statistic to a predetermined threshold. The threshold is based on the priority.

20 Claims, 5 Drawing Sheets

STATISTICAL PRIORITY-BASED MULTIPLE ACCESS SYSTEM AND METHOD

GOVERNMENT LICENSE

The invention was made with U.S. Government support under contract no. F33615-01-C-1856 awarded by the Defense Advanced Research Projects Agency (DARPA) and the U.S. Government has certain rights in this invention.

BACKGROUND

Conventional communication systems may use spread spectrum techniques to spread information across a frequency bandwidth that is significantly larger than the information bandwidth. Direct sequence spreading and/or frequency hopping may allow many different users to simultaneously share the same frequency space. These simultaneous streams provide well understood and controlled interference with respect to one another. The information in each individual stream may be recovered using the coding gain associated with the spreading of a smaller amount of information over a larger frequency bandwidth. For example, code division multiple access (CDMA) or a hybrid CDMA/time division multiple access (TDMA) are typically used for systems such as these. CDMA tends to work well in systems such a cellular telephone or wireless local area networks (LANs) where all the mobile units in a region connect to a central access point that can control the interference between mobile users by adjusting their powers. Hybrid CDMA/TDMA may work well in systems where communications follow regular patterns or where required latencies permit time for bandwidth negotiations.

However, conventional CDMA solutions tend to fail catastrophically when more traffic is offered to the network than the network is capable of handling. Conventional CDMA also lends itself poorly to prioritization of traffic and/or recognition of a variety of classes of service (CoS). These capabilities are of increasing importance to network designers for assurance of quality of service (QoS). Further, hybrid CDMA/TDMA approaches fail when traffic is highly irregular, required latencies are very small, and/or when the system propagation delay is significant compared to the average message length.

Accordingly, there is a need for systems which solve many of the above mentioned problems and, among others, may meet the following requirements:
1. Extremely low latency on delivery of one support Class of Service (CoS).
2. 99% first time success for the low latency CoS, since there may not be time for a repeat.
3. Support for multiple different Classes of Service (CoS).
4. Large number of users.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a method of controlling channel access in a communication system. The method includes providing a data packet to a communications queue. The method also includes determining the priority of the data packet. Further, the method includes generating a channel occupancy statistic, the channel occupancy statistic being based on the level of activity on a communications channel during a predetermined period. Further still, the method includes comparing the channel occupancy statistic to a predetermined threshold. The threshold is based on the priority of the data packet.

Another example of the invention is related to a communications device. The communications device includes a transceiver. The communications device also includes a processor. Further, the communications device includes a control algorithm running on the processor. The control algorithm compares a channel occupancy statistic to a threshold. The threshold is based on the priority of an outgoing data packet. The channel occupancy statistic is based on the level of activity on a communications channel during a predetermined period.

Yet another example of the invention relates to a method of controlling data traffic in a communications system. The method includes queuing a data packet with an associated priority. The method also includes checking a channel occupancy statistic, the channel occupancy statistic being based on the integral of the number of pulses being received on the communications channel during a predetermined period. Further, the method includes determining whether to transmit the data packet, based on the channel occupancy statistic and a threshold. The threshold is based on the priority.

Alternatively exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Statistical priority-based multiple access (SPMA) may be viewed as a generalization of carrier sense multiple access (CSMA) for spread spectrum systems. CSMA is conventionally applied to narrow band systems. In CSMA, the channel may have one of two states, busy or idle. The state of the channel is sensed. If the channel is idle when a packet arrives for transmission, the packet is transmitted. If the channel is busy when the packet arrives for transmission, the packet is backed-off according to a predefined algorithm and transmission will be attempted again at a later time. SPMA is similar to CSMA in that the state of the channel is sensed. However, since SPMA is designed for spread spectrum systems, the channel may take on many different states depending on the amount and characteristic of the traffic that is sensed on the channel. Each class of service (CoS) that is available to the SPMA system will have a predefined set of channel states within which it may be transmitted. When a packet is received from the higher network layers for transmit by the SPMA media access function, the state of the channel is assessed to determine whether or not the channel state will allow the packet to be transmitted. As in the case of CSMA, if the predefined policy for the packets CoS allow it to be transmitted, the packet will be transmitted. If not, the packet will be backed-off according to a predetermined CoS based back-off algorithm and transmission will again be attempted at a later time.

$TxRx^N$ Waveform

Given, for example, a system for which 10 Mbps throughput is desired, on average at least 5 of the 2 Mbps individual transmissions must occur at any given time. If we assume 200 users are on the channel in this scenario, it may be implied that 5 of 200 or 2.5% of the users are transmitting at any given time. If fewer users were producing the same aggregate 10 Mbps system throughput, the fraction of users transmitting at any given time would increase.

Accordingly, two facts have been derived from the given exemplary requirements. The first is that each user is required to transmit with a duty cycle of at least (probably more than) 2.5%. The second fact is that there is not sufficient time within the system latency budget for the access delay to wait for a transmission to end before accessing the channel. (There is also not enough time to allow a control command that the transmission must end to propagate to the transmitter).

Given the 2.5% transmit duty factor and the need for immediate channel access, along with the required packet error rate of 1 percent or less, which is less than the 2.5% transmit duty factor, for the system to work, the channel waveform must be designed to allow simultaneous transmission and reception. This simultaneous transmission and reception is necessary otherwise, at least 2.5% of the packets intended for reception by a transceiver would be lost due to the fact that the transceiver is transmitting at the time the packet was received.

To facilitate this simultaneous transmission and reception, a waveform using a combination of time-hopping and frequency-hopping provides a capability defined as $TxRx^N$, has been devised for use with the SPMA approach. Simply put, $TxRx^N$ capability means that a given node should be capable of transmitting at 2 Mbps data rate while simultaneously receiving N independent data streams at 2 Mbps each.

This is possible, because, for example, when a node is "transmitting" at what is apparently 2 Mbps of user data, it is actually transmitting user data bursts at, for example, 13.333 Mbps with a 15 percent duty cycle and listening 85 percent of the time for bursts from other nodes. The actual symbol rate with rate ⅓ rate coding would then be 40 Mbps. Twenty-seven user bursts per user packet, hopped in time and frequency, might be a typical number. The rate ⅓ coding is run over all the bursts, and a packet can typically be recovered with as few as half the bursts in a pure erasure channel. Partial bursts can be utilized as well. Any portions of bursts arriving at a node during the 15 percent of the time the node is actually transmitting will be lost. Those bursts will be recognized as erasures, but the channel is not a pure erasure channel.

Considering only whole bursts, a slotted system can allow only 1 percent channel loading to achieve 99 percent one-hop first-time success. In the system above, 27 bursts each achieve only 85 percent success. But 99.58 percent of the time, at least 17 of the 27 bursts in a given packet will be received. For erasures, only about 14 of 27 bursts are required with the turbo coding scheme used to recover the user data packet perfectly better than 99 percent of the time. The net effect is to improve channel utilization from 1 percent to 15 percent, but the rate ⅓ code reduces the net gain to 5 percent for an overall channel utilization improvement by bursting and coding of 5 times.

Exemplary simulations have shown that with power levels estimated for 100 NM operation, the system should be able to provide $TxRx^4$ or $Rx^7$ with less than 1 percent Packet Error Rate (PER) for the weakest signal. Additionally, when N becomes larger, the stronger of the signals are still received. This is important because it implies that system throughput does not rapidly fall off as the channel becomes overloaded. Rather, effective communication range is reduced. For purposes of this discussion, we will take this behavior of our $TxRx^N$ as a given and is not further necessary for the understanding of the SPMA concept.

The SPMA Control Protocol

The principal purpose of the SPMA control protocol is to keep the system in the favorable loading situation discussed above in which 99 percent first time success per user packet is achieved.

Figure 1:
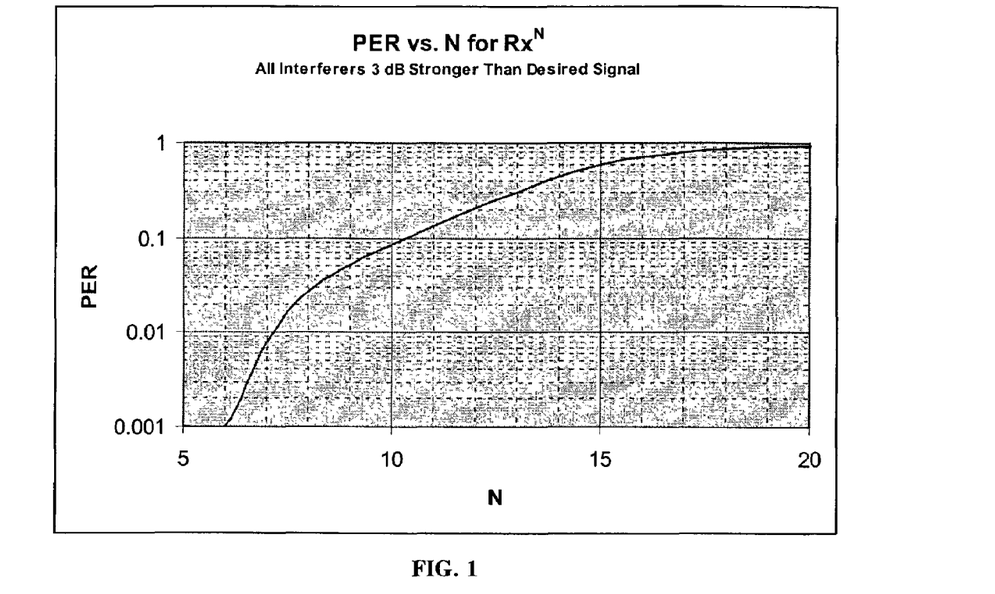
FIG. 1 is an exemplary depiction of the packet error rate (PER) versus the number of transmitters (N)

The $TxRx^N$ modulation and coding approach, discussed in the previous section, leads us to a simulated packet success rate as depicted in FIG. 1. Notice that this curve is for a received signal 3 dB weaker than N−1 interfering signals. The weaker signal is received as shown on the curve. The N−1 interfering signals would be received better as they are stronger. As N becomes large, simulations show that the strongest four or five of the N signals will tend to continue to get through.

The exemplary FIG. 1 depicts that 99% success is achieved for a weak signal in the presence of six 3 dB stronger signals for a total of at least 7 signals received. When the number of signals increases from 7 to 10, the weakest signal is still correctly received about 90% of the time. Even with 14 signals, the weakest of the 14 is received correctly about 55% of the time and stronger signals are received correctly more often. While 90% and 55% correct reception is not acceptable as a normal system operating point, this illustrates that the $TxRx^N$ lends a natural level of stability to the system in that throughput does not rapidly decrease as the system becomes overloaded.

Figure 2:
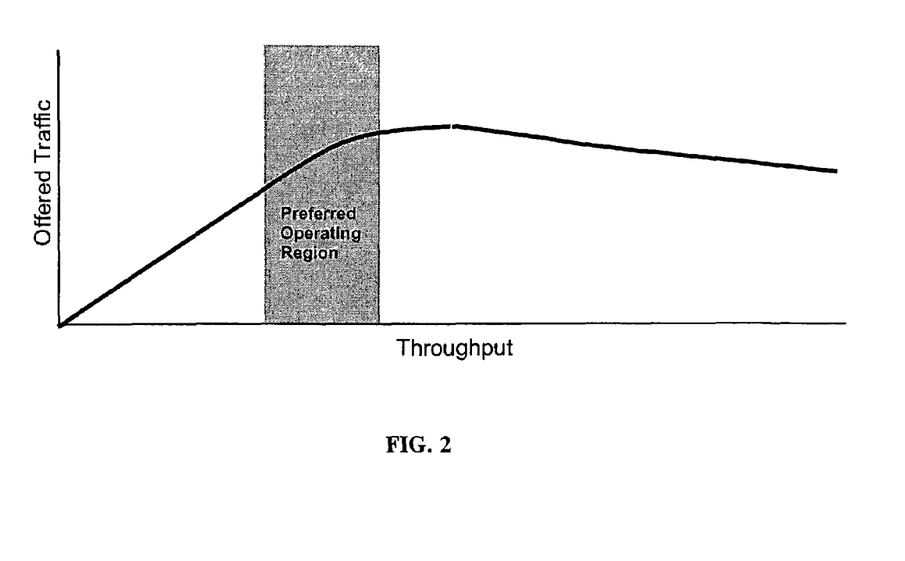
FIG. 2 is a generalized exemplary graph of the preferred operating region with offered traffic versus throughput.

Because of this residual throughput of the strongest signals even in a fairly heavily loaded network, the $TxRx^N$ channel provides a throughput versus offered traffic curve that is notionally shown in FIG. 2. This curve is expected for two reasons: First, detailed simulations of the modulation and coding indicate that a stronger signal is not significantly degraded by a weaker signal so it is reasonable to assume that at a minimum the strongest transmission would be completed. Second, modulation and coding simulations indicate that even as N becomes larger than the ideal control point we can still receive even a significant number of even the weakest packets correctly. This would tend to indicate that the penalty associated with a slightly overloaded channel is not severe. Two considerations provide evidence that, unlike many classical systems, the system will not quickly become unstable when it is operated beyond the preferred operating region.

However, if left to its own devices, the system would still be able to transmit data (primarily to near nodes) until it went far into an overload condition and ultimately became unstable. Some data may still be delivered to near neighbors, however, this behavior is not acceptable since high priority data would be discarded along with low priority data and retransmissions would prematurely push the system further and further into overload.

Limiting the number of retransmissions can slow down the process of overloading and lend a level of partial stability. However, it does nothing to ensure that the highest priority data will be received correctly in an overloaded network. What is needed is a means of controlling the offered loading so that the first-time success rate for the highest priority traffic does not fall below the 99% that is required.

Conventionally, this could be accomplished by a direct channel sensing algorithm, when the number of transmitters on the channel exceeds a certain value, lower priority traffic would be held off. This would be analogous to an extension of the classic Carrier Sense Multiple Access (CSMA) approach to controlling traffic. Unfortunately, in some systems, the maximum propagation time in the system is longer than the packet length. Because of this, by the time one transmitter senses that its packet will collide with another packet, the packet is likely to already have been completely transmitted. Therefore, the classic CSMA approach to controlling the channel will not work well for these systems.

Another approach to controlling access to the channel is Time Division Multiple Access (TDMA). The problem with TDMA is that it is not able to provide the 2 msec latency that is required. The reason for this is in the slot structure that is inherent to TDMA. TDMA has a minimum slot size requirement that must include the system differential propagation delay, clock errors, and the minimum packet size. For TTNT, the propagation delay at 100 NM is 619 µsec. (Note: For 200 NM or 300 NM operation, this propagation delay is increased to 1238 and 1857 µsec respectively.) Assume a minimum packet size of 400 bits. At 2 Mbps, 400 bits would require 200 µsec. Assuming no clock errors, the smallest a slot could be made is 819 µsec. Assume a packet could arrive at the transmitter just too late to make a certain slot and need to be held until the next slot. Assume, also, that that packet is sent to a node that is at maximum range. The latency for that packet by the time it is received by distant packet is 1638 µsec without adding in any time for transmit message handling delays, message encryption, forward error correction, error detection and correction, message decryption, or receive message delays. Even if these delays could all be held to less than 363 µsec, this example assumes that the next slot is available for transmit by the node that needs to transmit. In general, TDMA controls access to the channel by assigning slots to individual nodes. Any specific node is likely not to have permission to transmit in a specific slot. In this case, the latency of the packet would be delayed by the number of slots that the transmitter would need to wait before gaining permission to access the channel.

Another approach toward managing low priority traffic on this type of a channel might be to have a central access controller or bandwidth broker. This approach could be used to force longer messages at lower priority to get permission from this central authority before being offered on the channel. This would work as a fall back to the SPMA approach. However, it is less desirable than the SPMA distributed approach because it requires all low priority communications (over a defined length) to be authorized by a central authority. This, in turn, leads to a single point of failure in the network, generates network traffic, and introduces delays as nodes wait for permission to transmit.

The desired system has propagation delays that are too long (or alternatively messages that are too short) to support a CSMA approach and latencies that make a TDMA approach impossible. Further, a central controller is not possible for high-priority, low-latency traffic, and it is undesirable for other traffic as discussed previously. Because of these issues a statistically based distributed approach to controlling traffic offered to the desired system is applied.

SPMA is the distributed traffic control protocol that is intended to control where on the curve shown in FIG. 2 the system operates. The job of SPMA is to ensure that the overall loading of the system remains low enough so that the success rate for the weakest signal does not drop below a given percentage. If the network loading should temporarily surge beyond this level and begin to overload, the SPMA must throttle back first the lower priority traffic. This avoids a situation in which the retransmissions of the weakest signals unduly increase offered traffic and push the system further to the right in FIG. 2. It also avoids operating under conditions in which high-priority low-latency traffic exceeds the 1 percent PER rate.

Figure 3:
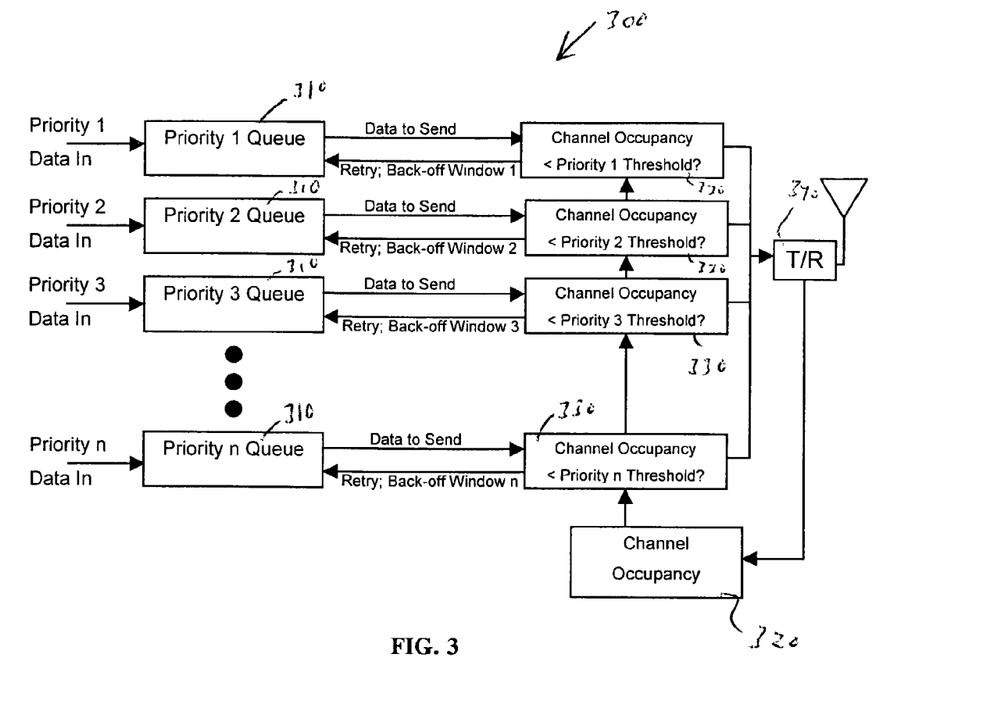
FIG. 3 is an exemplary block diagram of a system incorporating statistical priority-based multiple access.
Figure 4:
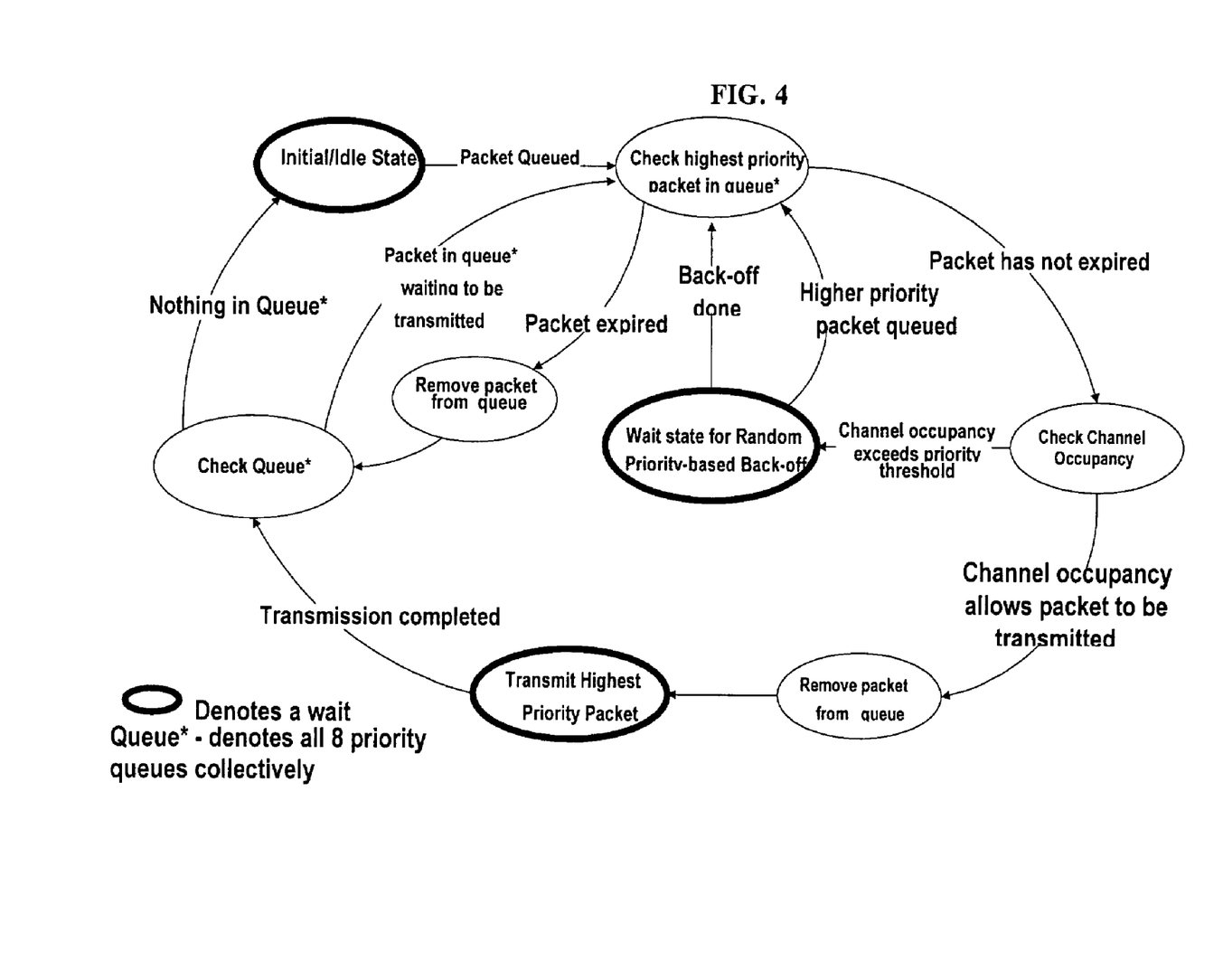
FIG. 4 is an exemplary state diagram depicting the statistical priority-based multiple access method.

FIG. 3 depicts a block diagram for the SPMA distributed control algorithm 300. When the transmitter is ready to accept a packet and data enters one of the queues 310, the current Channel Occupancy statistic 320 is compared against a threshold for that priority 330. If the Channel Occupancy is below the threshold 330, the packet is transmitted by transceiver 340. If the Channel Occupancy 320 is above the threshold, the node will wait a random back-off interval, according to the priority, and re-check the Channel Occupancy statistic 320. If during this random back-off interval, a packet is queued for transmission at a lower priority, it is held in the queue 310 until the higher priority packet is either sent or expires in the queue 310. If a higher priority packet is queued for transmit during the back-off interval, the back-off is canceled and the Channel Occupancy statistic 320 is immediately tested against the threshold of the higher priority packet. In FIG. 3 a single transmitter and receiver 340 are shown. In general this is a multi-channel system with one transmitter hopping over the channels and a receiver per channel. The Channel Occupancy statistic 320 is computed over the entire frequency-time space available using data from all the receivers. The State Flow Diagram for this control is depicted in FIG. 4.

The Channel Occupancy statistic is received by the SPMA control algorithm from the physical layer. The Channel Occupancy is derived based upon the number of pulses received on the channel which have an embedded synchronization pattern that matches the Transmission Security (TSEC) derived synchronization pattern for that channel within a specified threshold. This number of pulses received provides an approximation of the number of transmissions that were presented to the channel. This number is integrated according to a sliding-window called the Channel Occupancy Window. The size of the Channel Occupancy Window is a variable parameter. Alternatively the Channel Occupancy statistic may be derived by looking for activity on the channel by any of a variety of methods including but not limited to detecting radio frequency (RF) energy on the channel.

The key parameters for SPMA are the Channel Occupancy Window, the Channel Occupancy Thresholds for each priority, and the Back-Off Window Sizes for each priority. These parameters may be modified depending on desired system performance.

Figure 5A:
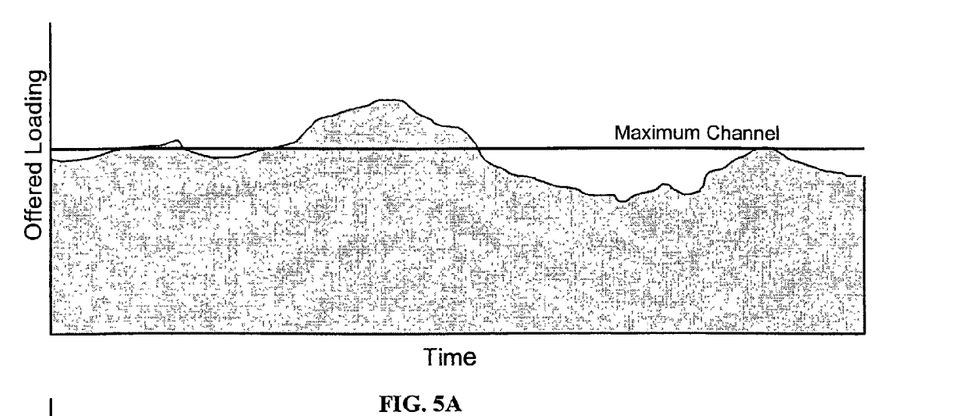
FIG. 5A is an exemplary graph depicting typical traffic.

A simplified notional picture of typical traffic loading is shown in FIG. 5A. In FIG. 5A, the traffic that is offered is seen to surge above the level of traffic that can be handled by the system for the required rate of first time success. In this simplified example, when excess traffic is offered, only the strongest signals will be correctly received. This overload will result in a decrease in the first try success rate for the system and will increase the effective offered traffic due to re-transmissions that will be necessary. Additionally, note there is no notion of priority once the packet is transmitted. Priority is meaningful only within the multi-priority queues of a given user before transmission. Once a packet is transmitted, all packets are equal. When the system begins to be overloaded, transmitted high priority packets are lost along with the transmitted low priority packets.

Figure 5B:
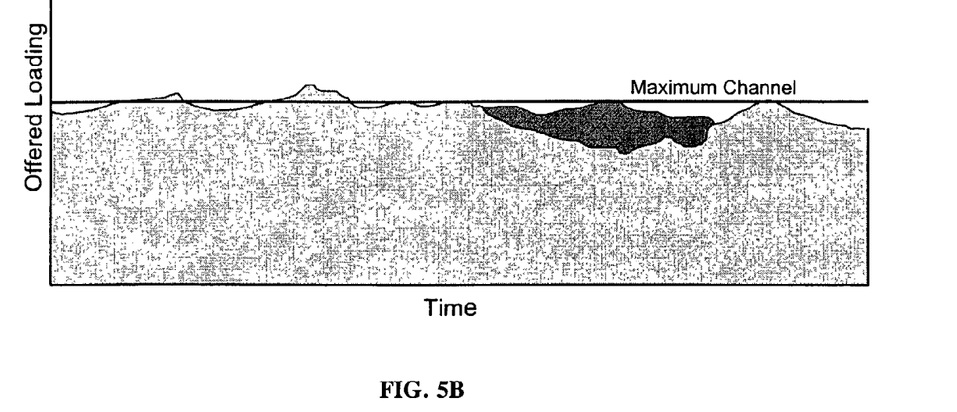
FIG. 5B is a exemplary graph of traffic with statistical priority-based multiple access controls.

SPMA controls the loading by delaying (and possibly rejecting) the lower priority packets based upon Channel Occupancy. This is done to maintain a 99 percent first-time success rate, which applies to all packets actually transmitted whatever their priority. FIG. 5B shows the same system with SPMA controls to throttle back traffic during periods in which the system becomes overloaded. These controls will have the effect of holding-off low priority packets when the channel is very busy. If the level of loading subsides, the low priority packets can then be sent. If the traffic level is consistently high, the system will begin to reject the lowest priority packets. As the system becomes more heavily loaded, it will reject successively higher priority traffic. The effect of this is to throttle back traffic as loading increases and to maintain a level of loading that ensures QoS is maintained for the higher priority packets.

In order to provide for operator monitoring and control of the network, a Management Information Base (MIB) may include a number of parameters and measured values associated with SPMA. The MIB should include variables that allow the network controller to monitor and set traps on total traffic flow and packet success rate. This will allow the controller to determine the level of communication and quality of communication at designated nodes throughout the network. The MIB should also support monitoring and trapping based on the Channel Occupancy statistic. Finally, the MIB should allow the network controller to set the SPMA Channel Occupancy Thresholds. This would allow an operator to tune the system as the tactical situation changes and to fend-off a denial of service attack based upon overloading of the channel.

In order to allow network control as the channel becomes heavily loaded, network control must be given the highest priority. Normally, there will be very little network control traffic in the system and the system will mostly require no intervention. However, when it is necessary due to changing tactical conditions or to fend-off system attack, it will be important that the network control information should not be held-off by the SPMA function.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of controlling channel access in preparation for transmitting a data packet in a communications system, the method comprising:

electronically providing the data packet to a communications queue;
   electronically determining a priority of the data packet;
   electronically generating a channel occupancy statistic, the channel occupancy statistic being related to the number of transmissions presented to a channel;
   electronically comparing the channel occupancy statistic to a predetermined threshold to determine whether to transmit the data packet;
   wherein the predetermined threshold is based on the priority of the data packet; and
   transmitting or delaying the data packet based on the comparison of the channel occupancy statistic to the predetermined threshold;
   wherein the channel occupancy statistic is based upon the number of pulses received on the channel having an embedded synchronization pattern matching a transmission security derived synchronization pattern.

2. The method of claim 1, wherein the channel occupancy statistic is received by a control algorithm in the physical layer.

3. The method of claim 1, wherein the channel occupancy statistic is calculated by integrating according to a sliding window.

4. The method of claim 1, wherein the sliding window is a channel occupancy window.

5. The method of claim 1, further comprising:
   regenerating the channel occupancy statistic after a random back-off time.

6. The method of claim 5, further comprising:
   transmitting the data packet.

7. The method of claim 1, further comprising:
   expiring the data packet.

8. The method of claim 1, wherein the channel occupancy statistic is based on the number of synchronistic pulses received.

9. A communications device for transmitting a data packet, comprising:
   a transceiver comprised of a transmitter and a plurality of receivers, each receiver being associated with a channel;
   a processor; and
   a control algorithm running on the processor, the control algorithm comparing a channel occupancy statistic to a predetermined threshold, the data packet being transmitted or delayed based on the comparison, the predetermined threshold being based on the priority of an outgoing data packet, the channel occupancy statistic being based on the level of activity during a predetermined period, the channel occupancy statistic being based upon the number of pulses received on the channel having an embedded synchronization pattern matching a transmission security derived synchronization pattern.

10. The communications device of claim 9, wherein the transceiver transmits the outgoing data packet.

11. The communications device of claim 9, wherein the control algorithm delays checking the channel occupancy statistic for the data packet by a randomly derived time period.

12. The communications device of claim 11, wherein the control algorithm rechecks the channel occupancy statistic.

13. The communications device of claim 9, wherein the channel occupancy statistic is calculated by integrating according to a sliding window.

14. The communications device of claim 9, wherein the control algorithm expires the data packet.

15. A method of controlling data traffic in a communications system, the method comprising:

electronically queuing a data packet with an associated priority;

electronically checking a channel occupancy statistic, the channel occupancy statistic being based on a number of pulses received on a channel including an embedded synchronization pattern matching a transmission security derived synchronization pattern;

electronically determining whether to transmit the data packet, based on the channel occupancy statistic and a predetermined threshold, the predetermined threshold based on the priority of the data packet; and electronically transmitting or delaying the data packet based on the channel occupancy statistic and the predetermined threshold.

16. The method of claim 15, wherein the queue is associated with same priority as the data packet.

17. The method of claim 15, wherein a channel occupancy window is computed.

18. The method of claim 15, further comprising:
selecting a random back-off time.

19. The method of claim 18, further comprising:
regenerating the channel occupancy statistic after the random back-off time.

20. The method of claim 19, wherein a transmitter hops to the one or more of the plurality of channels.

* * * * *